United States Patent [19]

Inoue

[11] 4,431,894
[45] Feb. 14, 1984

[54] METHOD OF AND APPARATUS FOR AUTOMATICALLY THREADING A CONTINUOUS ELECTRODE WIRE IN AN ELECTROEROSION MACHINE

[75] Inventor: Kiyoshi Inoue, Tokyo, Japan

[73] Assignee: Inoue-Japax Research Incorporated, Yokohama, Japan

[21] Appl. No.: 318,255

[22] Filed: Nov. 4, 1981

[30] Foreign Application Priority Data

Nov. 10, 1980 [JP] Japan ................................ 55-157044

[51] Int. Cl.³ .............................................. B23P 1/12
[52] U.S. Cl. ............................. 219/69 W; 219/69 M; 219/69 E
[58] Field of Search ............... 219/69 W, 69 M, 69 E, 219/69 V, 69 R

[56] References Cited

U.S. PATENT DOCUMENTS

| 3,987,270 | 10/1976 | Ullmann et al. | 219/69 W |
| 4,123,645 | 10/1978 | Shichida et al. | 219/69 W |
| 4,242,559 | 12/1980 | Roemer et al. | 219/69 W |

Primary Examiner—M. H. Paschall
Attorney, Agent, or Firm—Karl F. Ross; Herbert Dubno

[57] ABSTRACT

An improved method of and apparatus for automatically threading a continuous electrode wire through a workpiece in a traveling-wire electroerosion machine wherein a rotary guide block having a tapered opening is disposed to locate the latter coaxially with a straight throughgoing hole preformed in the workpiece and arranged in alignment with a straight line path defined between a pair of wire guide members. A free end of the electrode wire extending from a wire supply or takeup is located behind the opening in the rotary guide block which is tapered convergently towards the workpiece. The electrode wire is advanced along the straight line path to introduce its free end into the tapered opening of the guide block which is rotated about its rotary axis to allow the free end to smoothly pass through the opening and then into and through the straight throughhole in the workpiece. A sensing/control circuit may be provided and arranged to detect a contact of the free end with the tapered wall of the opening to initiate the rotation of the rotary guide block or to control its rate of rotation and/or the rate of advance of the electrode wire in accordance with the particular position of a point of contact of the free end with the tapered wall.

32 Claims, 2 Drawing Figures

FIG. 1

METHOD OF AND APPARATUS FOR AUTOMATICALLY THREADING A CONTINUOUS ELECTRODE WIRE IN AN ELECTROEROSION MACHINE

FIELD OF THE INVENTION

The present invention relates to a new and improved method of and apparatus for automatically setting or resetting a machining-electrode wire in an operating set-up on a traveling-wire electroerosion machine. More particularly, it relates to a novel method of and apparatus for automatically threading a continuous electrode wire through a workpiece in a traveling-wire electroerosion machine.

The term "electroerosion" used herein is intended to refer broadly to the process of electrical machining in general, including electrical discharge machining (EDM), electrochemical machining (ECM) and electrochemical-discharge machining (ECDM).

The term "electrode wire" used herein is intended primarily to refer to an elongated electrode in the form of a thin continuous wire, but may include any other similar form of elongated electroerosion electrode such as one of tape form. The invention particularly concerns a method of and apparatus for automatically threading or passing such a continuous electrode wire through a workpiece on an electroerosion machine.

BACKGROUND OF THE INVENTION

In the traveling-wire electroerosion machine, the continuous electrode wire is axially transported from a supply means to a takeup means. In the path of wire travel, a pair of machining guide members are commonly disposed at opposite sides respectively of the workpiece to define a straight line path therebetween for the transported electrode wire. The latter is thus tightly stretched across the guide members while axially traveling continuously and traversing the workpiece, and the guide members serve to position the electrode wire in a machining relationship with the workpiece. The machine further includes a power supply for passing an electrical machining current, typically in the form of a succession of pulses, between the electrode wire and the workpiece across a machining gap flooded with a machining liquid, e.g. water, to electroerosively remove material from the workpiece. As the process proceeds, the workpiece is displaced transversely relative to the axis of the electrode wire along a prescribed feed path under the command, preferably, of a numerical-control (NC) unit, so that a desired cut is formed in the workpiece.

A traveling-wire electroerosion machine is generally and commonly required to machine a number of cuts or contours in a workpiece or similar workpieces in a sequence of operations. In each operation, it is necessary that machining should start with a through-hole (i.e. a through going hole) performed at a given point associated with each contour desired. Thus, prior to proceeding with any given machining operation, the wire electrode must be threaded or set through a starting through-hole and, subsequent to accomplishment of such machining operation, the wire electrode must after removal from the machined contour or the hole be again threaded or reset through another preformed starting through-hole associated with another contour desired to be machined in the same or another workpiece. Each resetting operation needed after a given machining operation and before another therefore requires breaking, at a region immediately above or below the workpiece, the electrode wire extending continuously between the supply and takeup sides, re-aligning the relative position between the said axis of the electrode wire and the worktable carrying the workpiece or workpieces, threading a broken end portion of the electrode wire through the starting through-hole associated with the contour to be machined, and then reloading the threaded electrode wire in the wire axial drive or transportation means downstream of the downstream guide member to re-establish its continuous axial travel from the supply side to the collection side.

In order to eliminate the necessity for manual intervention, an automatic wire resetting arrangement has advantageously been provided which is designed to execute the foregoing wire resetting operation automatically. For such prior art, reference may be made to U.S. Pat. Nos. 3,891,819 and 3,987,270. With the known set-up arrangements, however, a difficulty on threading arises due to the extreme thinness (e.g. less than 0.5 mm thickness) of the electrode wire and the consequent poor self-sustaining ability of the wire. As a matter of practice, thus, it has been found that very often an electrode wire is deflected prior to entry into a small starting through-hole or otherwise is caught on a wall portion of the through-hole and also even on a wall portion of a guide member accepting the electrode wire.

OBJECTS OF THE INVENTION

The present invention therefore seeks to provide a novel and improved method of automatically setting or resetting a machining-electrode wire in an operating set-up on a traveling-wire electroerosion machine in which method threading or passing the electrode wire through a workpiece is automatically achieved without fail.

The present invention also seeks to provide a novel and improved apparatus for automatically setting or resetting a machining-electrode wire in an operating set-up on a traveling-wire electroerosion machine, which apparatus is capable of automatically threading the electrode wire through a workpiece without fail and is capable of achieving a given machining operation with an increased efficiency.

The present invention specifically seeks to provide a novel and highly efficient method of and apparatus for automatically threading a continuous electrode wire through a workpiece in a traveling-wire electroerosion machine.

SUMMARY OF THE INVENTION

In accordance with the present invention there is provided, in a first aspect thereof, a method of automatically threading a continuous electrode wire through a workpiece in a traveling-wire-electroerosion machine having a pair of guide members defining therebetween a straight line path for the electrode wire, and drive means for axially displacing the electrode wire along the straight line path between wire supply means and wire takeup means for electroerosively contour-machining the workpiece, which method comprises the steps of: (a) positioning the workpiece having a preformed straight through-hole to locate the through-hole in alignment with the straight line path; (b) disposing, at one side of the workpiece in the straight line path between the wire supply and takeup means, a rotary guide block having a rotary axis and a tapered opening coaxial therewith to locate the opening coaxially with the straight through-hole, the opening being tapered convergently in the direction of the workpiece; (c) locating, behind the opening in the straight line path, a broken end of the continuous electrode wire extending from one of the wire supply and takeup means; and (d) advancing the continuous electrode wire from the said one of the supply and takeup means to introduce the broken end into the tapered opening while rotating the guide block about the rotary axis to allow the broken end to pass through said opening and then into and through the straight through-hole.

Specifically, the continuous electrode wire may extend from the wire supply means and the rotary guide block may be disposed at the said one side which is located on the side of the supply means with respect to the workpiece. In step (c) the broken end may be located ahead of one of the guide members which is located on the side of the wire supply means and behind the rotary guide block. In step (d) the continuous electrode wire may be advanced to bring the broken end passed through the straight through-hole onto the other of the guide members, the method then comprising, in step (d), the step of advancing the electrode wire to guide the broken end passed through the said other guide member into the wire takeup means.

Here, the electrode wire may be one broken half of a continuous stretch previously extended between the wire supply and takeup means. The method may then further comprise, prior to step (a), the steps of breaking the continuous stretch to divide it into the said one broken half and the other broken half extending to the wire takeup means and displacing the said other broken half past the said other guide member into the wire takeup means. The continuous stretch may be broken at a region ahead of the position of the rotary guide block in the straight line path, the method further comprising the step of retracting the said one broken half past the position of the rotary guide block to locate the first-mentioned broken end in step (c). Alternatively, the continuous stretch may be broken at a region behind the position of the rotary guide block and ahead of the said one guide member in the straight line path to locate the first-mentioned broken end in step (c).

Alternatively, the electrode wire being one broken half of a continuous stretch previously extended between the wire supply and takeup means, the other broken half may extend from the takeup means and has a broken end located at a region in the straight line path between the workpiece and the other guide member. In step (d) the continuous electrode may be advanced until the first-mentioned broken end is brought into engagement with the second-mentioned broken end. The method then comprises further the step of connecting the two broken ends together at the said region to re-establish the continuous stretch.

The method may then further comprise, prior to step (a), the steps of breaking the continuous stretch at the said region and retracting the said one broken half to locate the first-mentioned broken end in step (c). Alternatively, the method may then further comprise, prior to step (a), the steps of breaking the continuous stretch intermediate between the positions of the said one guide member and the rotary guide block in the straight line path and displacing the said other broken half past the position of the rotary guide block to locate the second-mentioned broken end at the said region. Also alternatively, the method may then further comprise, prior to step (a), the steps of breaking the continuous stretch intermediate between the positions of the rotary guide block and the said other guide member, retracting the said one broken half to locate the first-mentioned broken end in step (c) and displacing the said other broken half to locate the second-mentioned broken end at the said region.

Alternatively, the continuous electrode wire may extend from the wire takeup means and in step (d) the rotary guide block may be disposed at the said one side which is located on the side of the takeup means with respect to the workpiece. In step (c) the broken end is then disposed ahead of one of the guide members which is located on the side of the wire takeup means and behind the rotary member.

Here again, the electrode wire may be one broken half of a continuous stretch previously extended between the wire supply and takeup means. The other broken half then extends from the wire supply means and has a broken end located at a region in the straight line path between the other guide member and the workpiece. In step (d) the continuous electrode wire is advanced until the first-mentioned broken end is brought into engagement with the second-mentioned broken end, the method further comprising the step of connecting the two broken ends together at the said region to re-establish the continuous stretch.

Here again, the method may then further comprise, prior to step (a), the steps of breaking the continuous stretch at the said region and retracting the said one broken half to locate the first-mentioned broken end in step (c). Alternatively, the method may then further comprise, prior to step (a), the steps of breaking the continuous stretch intermediate between the positions of the said one guide member and the rotary guide block in the straight line path and displacing the other broken half past the position of the rotary guide block to locate the second-mentioned broken end at the said region. Also alternatively, the method may then further comprise, prior to step (a), the steps of breaking the continuous stretch intermediate between the position of the rotary guide block and the other guide member, retracting the said one broken half to locate the first-mentioned broken end in step (c) and displacing the said other broken half to locate the second-mentioned broken end at the said region.

In accordance with an important feature of the present invention, the method includes the steps of sensing a contact of the broken end of the electrode introduced into the aforesaid opening with a tapered wall thereof and rotating the rotary guide block in response to the sensed contact.

In accordance with a further important feature of the present invention, the aforesaid opening has a plurality of frustoconical wall sections, each symmetrical about the rotary axis, divided in its longitudinal direction and the method further comprises the step of sensing a contact of the broken end with one of the wall sections and controlling the rate of rotation of the rotary guide block and/or the rate of advance of the electrode wire in step (d) in accordance with the position of the particular wall section first contacted by the broken end.

The invention also provides, in a second aspect thereof an apparatus for automatically threading a continuous electrode wire through a workpiece in a traveling-wire electroerosion machine having a pair of guide members defining therebetween a straight line path for the electrode wire, and drive means for axially displacing the electrode wire along the straight line path between wire supply means and wire takeup means for electroerosively contour-machining the workpiece, which apparatus comprises means for positioning the workpiece having a preformed straight through-hole to locate the through-hole in alignment with the straight line path; a rotary guide block having a rotary axis and a tapered opening coaxial therewith; means for rotatably supporting the guide block at one side of the workpiece in the straight line path between the wire supply and takeup means to locate the tapered opening coaxially with the straight-hole and tapered convergently in the direction of the workpiece; means for locating, behind the opening of the rotary guide block in the straight line path, a broken end of the continuous electrode wire extending from one of the wire supply and takeup means; means for advancing the continuous electrode wire from the said one of the supply and take-up means to introduce the broken end into the tapered opening; and means for rotating the guide block about the rotary axis to allow the broken end to be advanced by the advancing means through the opening of the guide block when in rotation and then into and through the straight through-hole.

Specifically, the afore-said advancing means may be constituted either at least as a portion of or independently of the afore-said drive means. As mentioned before, the electrode wire may be one broken half of a continuous stretch previously extended between the wire supply and takeup means or threaded through another hole in said or another workpiece between the guide members. The apparatus may further comprise means for breaking the continuous stretch between the supply and takeup means at a location between the guide members to divide it into the said one broken half and the other broken half extending from the other of the supply and takeup means and having a broken end. The apparatus may further include means for connecting the first-mentioned broken end which was threaded through the said preformed through-hole with the second-mentioned broken end at a location ahead of the guide block in the straight line path.

Preferably, gas blasting means may further be provided for applying a blast of gas onto the continuous stretch to strip a residue of electroerosion machining liquid adherent thereon at least in the region of the said location. Furthermore, means may also be provided for heating the said continuous stretch prior to breaking by the breaking means.

The apparatus preferably includes means for sensing a contact of the broken end of the electrode wire introduced into the aforesaid opening with a tapered wall thereof to produce an electrical signal and control means responsive to the electrical signal for acting on the aforesaid rotating means to rotate the rotary guide block.

The aforesaid tapered opening preferably has a plurality of frustoconical wall sections, each symmetrical about the rotary axis, divided in the direction of its longitudinal direction. The apparatus then comprises means for sensing the broken end first contacting one of the divided wall sections when introduced into the opening by the aforesaid advancing means and means responsive to the sensing means for controlling the rate of rotation of the rotary guide block and/or the rate of advance of the electrode wire in accordance with the position of the particular wall section first contacted by the broken end.

BRIEF DESCRIPTION OF THE DRAWING

These and other features of the present invention as well as advantages thereof will become more readily apparent from the following description of certain embodiments thereof made with reference to the accompanying drawing in which.

SPECIFIC DESCRIPTION

Figure 1:
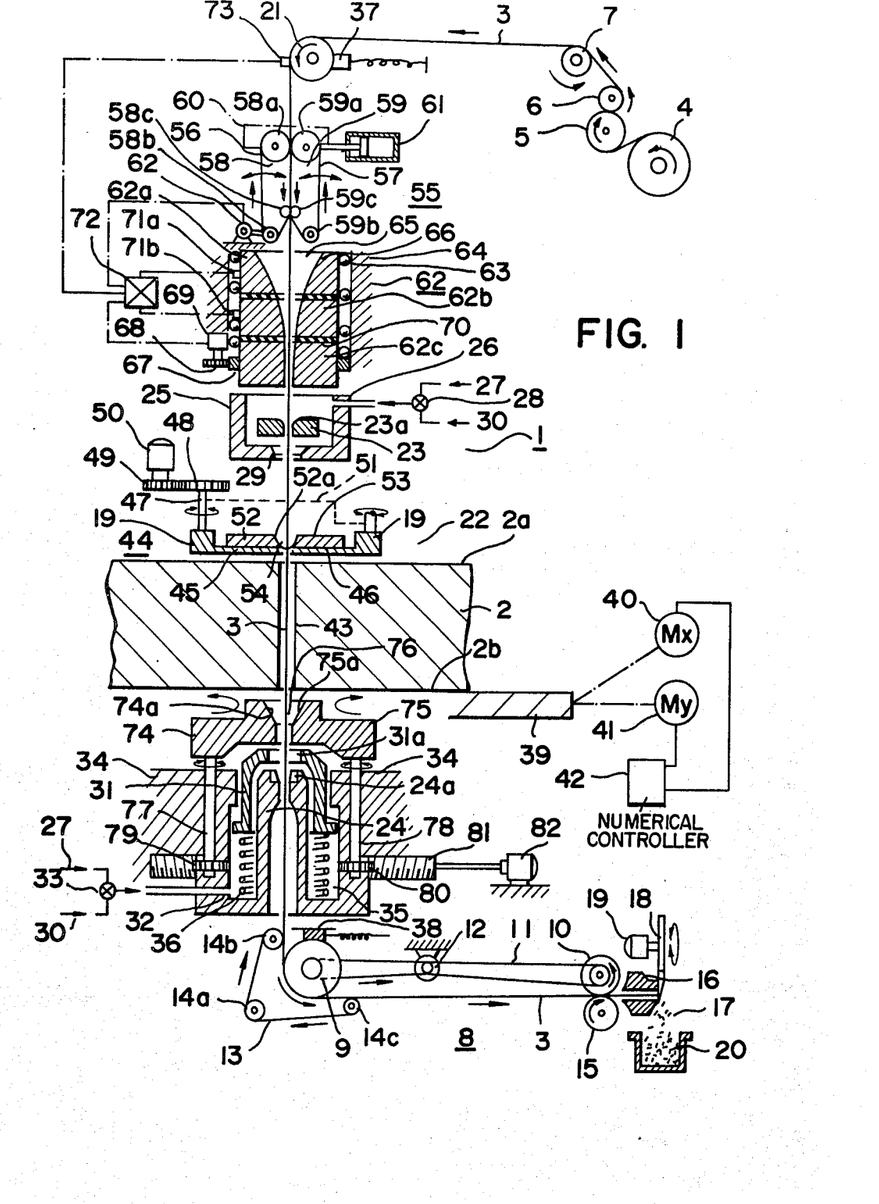
FIG. 1 is a schematic view, essentially in elevational section, of an apparatus embodying the present invention.

Referring now to FIG. 1, the essential portions of a traveling-wire electroerosion machine 1 incorporating an automatic wire-threading apparatus according to the present invention arranged in certain preferred form will be described.

The arrangement shown illustrates the state in which a machining electrode wire 3 has been threaded through a starting through hole 43 preformed in a workpiece 2 and commences being axially transported for the electroerosive machining of the workpiece 2.

The machine 1 is designed to electroerosively contour-machine the workpiece 2 with the electrode wire 3 which is fed from a supply reel 4 via guide rollers 5, 6 and 7 and which is fed ultimately into a wire takeup unit generally designed at 8. The takeup unit 8 includes rollers 9 and 10 which are drivingly coupled together by an endless belt 11 displaceable by a drive motor 12. The roller 9 cooperates with an endless belt 13 that passes around rolls 14a, 14b and 14c and the roller 10 cooperates with a idler roller 15. With the motor 12 driven, the electrode wire 3 fed from the region of the workpiece 2 is caught between the rotating roller 9 and the moving endless belt 13 and then led between the rotating rollers 10 and 15. The wire 3 led from the latter is guided through an opening 16 and cut up into wire pieces 17 by a rotary blade 18 reciprocatingly driven by a motor 19. The wire pieces 17 are fed down by gravity into a receptacle 20 for disposal. The rollers 5, 6 and 7 on the wire supply side 4 are adapted to apply a braking force and hence an appropriate tension to the traveling electrode wire 3.

In the path of wire travel between the wire supply and takeup units 4 and 8, a straight line path is provided between a guide roller 21 and the takeup roller 9 which also serve to change the direction of wire travel from the supply 4, 5, 6 and 7 to the machining zone 22 and from the latter to the takeup 8, respectively. In the straight line path, a pair of further wire-positioning guides 23 and 24 are provided to precisely position the axis of the electrode wire 3 traveling through the machining zone 22 relative to the workpiece 2. The upper guide 23 may be of a die type having a guide opening 23a and is shown disposed in a chamber 25 supplied through its inlet 26 with an electroerosion machining liquid 27 from a source (not shown) via a valve 28 and having its outlet or nozzle 29 open in the direction of the workpiece 2 to form a passage for both the traveling electrode wire 3 and the machining liquid 27 directed to the cutting site on the workpiece 2. A source of compressed blasting air 30 which will be described latter is also connected to the valve 28. The lower guide 24 is shown having a ring-form guide element 24a which may be composed of sapphire, anchored therein and is also shown arranged in a nozzle assembly 31 having a nozzle 31a which is open towards the workpiece 2 and which communicates via a nozzle inlet 32 and a valve 33 with a source of the machining liquid 27 to deliver the latter into the cutting site in the workpiece 2. A source of compressed blasting air 30 is also connected to the valve 33. The guide member 24 is constructed integrally with a frame or frames 34. Disposed within a compartment 35 defined by the outer walls of the guide member 24 and the inner walls of the frame 34 is a helical spring 36 which resiliently supports the fluid delivery nozzle 31.

The electrically conductive guide roller 21 at the wire upstream side and the electrically conductive guide roller 9 at the wire downstream side have brushes 37 and 38 in contact therewith, respectively. The brushes 37 and 38 are connected to one output terminal of an electroerosion power supply (not shown) which has its other output terminal electrically connected to the workpiece 2 to apply an electroerosion machining current between the electrode wire 3 and the workpiece 2 across the machining gap flooded with the liquid machining medium 27, thereby electroerosively removing material from the workpiece 2. The latter is securely supported on a worktable 39 which is dislaced horizontally or in an X-Y plane to move the workpiece 2 relative to the axis of the electrode wire 3 in the machining zone 22, the wire traveling continuously along the straight line path between the machining guide members 21 and 9. The workpiece 2 is moved relative to the straight line path or the axis of the electrode wire 3 between the machining guide members 21 and 9 by means of a pair of motors 40 and 41 designed to displace the worktable 39 along the X-axis and Y-axis, respectively. The motors 40 and 41 are fed with drive signals furnished from a numerical-control (NC) unit 42 having data preprogrammed therein to move the workpiece 2 relative to the electrode wire 3 along a predetermined path or trajectory in accordance with a desired contour to be machined in the workpiece 2.

Prior to or subsequent to a given electroerosion machining operation effected in the foregoing manner, the electrode wire 3 must be threaded through a preformed starting through-hole 43 in a workpiece 2. Subsequent to such an electroeroson operation, it is thus necessary to break the continuous electrode wire 3 stretched between the supply reel 4 and the takeup unit 8 and threaded through the through-hole 43, at a location between the workpiece 2 and the upstream guide member 21 of the downstream guide member 9. To this end, a breaking assembly 44 is provided or brought into operating position between the nozzle unit 25 and the workpiece 2 in the embodiment shown, and is constructed and operates in the manner to be described. Prior to breaking the continuous electrode wire 2 and subsequent to a previous traveling-wire electroerosion machining operation (which is completed with the electrical disconnection of the electroerosion power supply from the workpiece 2 and the electrode wire 3, the halting of the machining feed displacement of the worktable 39, the halting of the axial drive of the continuous electrode wire 3, and the terminating of the supply of the liquid machining medium onto the workpiece 2 through the nozzles 25 and 31), it is advantageous to strip off any residue of the liquid machining medium that remains adherent to the electrode wire 3. To this end, the valves 28 and 33 are switched to connect the sources of compressed blasting air (or any other suitable gas) 30 to the nozzles 25 and 31, respectively, to allow air or other gaseous blasts to be applied to the electrode wire 3 located between the positioning guide members 23 and 24 and passing through the preformed hole (43) used in the previous machining operation.

The wire-breaking assembly 44 comprises a pair of cutting blades 45 and 46. The blade 45 is shown carried via a linkage by a shaft 47 rotatable via gears 48 and 49 by a motor 50 secured to a frame (not shown), while the blade 46 is similarly carried and coupled with such a motor (not shown) secured to the same frame. These motors are designed to operate synchronously with one another as indicated by the broken line 51 shown. During a traveling-wire electroerosion machining operation, the blades 45 and 46 are placed in their respective angular positions in which they are out of mutual engagement. For the wire-breaking operation, the blades are rotated so as to be brought together to break the continous wire 3 at the desired position and to divide it into an upstream broken half and a downstream broken half. The takeup rollers 9 and 10 are then driven to feed the downstream broken half into the collecting zone and to allow it to be disintegrated into pieces 17 for reception by the receptacle 20. Prior to breaking, it is advantageous to heat the electrode wire 3 stretched between the guide rollers 21 and 9 while a sufficient tension is applied thereto. To this end, the guide rollers 21 and 9 may be energized by an electrical heating current furnished via the brushes 37 and 38 from a heating current supply which is provided separately from the electroerosion machining power supply. When the wire 3 is broken, the cutting blades 45 and 46 are angularly retracted by operating the motors (50) to withdraw their cutting edges from the straight line path between the machining guide members 23 and 24.

Subsequent to the wire-breaking operation, the worktable 39 is displaced under the command of the NC unit 42 to position the workpiece 2 so as to locate a new machining-start through-hole (43) in alignment with the straight line path defined between the guide members 21 and 9, i.e. in alignment with the longitudinal axis of the free end portion of the upstream broken half of wire 3 projecting from the upper machining guide member 21, and then a wire-threading operation for the new through-hole may be initiated.

Shown disposed flush above the cutting blades 45 and 46, respectively, are a pair of plates 52 and 53 which are carried by a pair of mobile assemblies (not shown), respectively, which are similar to the assemblies (47–51) for the blades 45 and 46, respectively. The plates 52 and 53 have, at their portions corresponding to the edge portions of the blades 45 and 46, tapered semi-circular surface formations (52a), respectively, which are designed, when they are brought together, to form a tapered circular hole 54 which constitutes a threading guide hole coaxial with the straight line path provided between the machining guide members 23 and 24. The plates 52 and 53 are normally held retracted angularly during the electroerosion operation and are brought together to form the tapered circular or guide hole 54 for the wire-threading operation. Of course, it will be understood that more than two such plates may be used to produce the guide hole 54. It is also possible to bring the plates 52 and 53 together or into their operating positions prior to the wire-breaking operation.

Disposed also at the upstream side of the workpiece 2 and especially immediately downstream of the guide roller 21 are a wire-advance drive unit 55 including a pair of endless belts 56 and 57 which pass around a combination of rollers 58a, 58b and 58c and a combination of rollers 59a, 59b and 59c, respectively. The wire-advance drive unit 55 may operate only during the wire-threading operation and may be removed during a machining operation. Thus, drive sub-units 58 and 59 which are coupled together by a linkage 60 are brought into engagement with the electrode wire 3 by a cylinder actuator 61 selectively for the wire-threading operation. In the wire-threading operation, the roller 58b is driven by a motor 162 to displace the belt 56. This causes the upstream broken half of the wire 3 to be drawn off the supply reel 4 and to displace the other belt 57. The displacement of the belts 56, 57 allows the wire 3 to be advanced and the broken free end thereof projecting from the upstream guide member 21 to be guided along the straight line path between the guide members 21 and 9.

In accordance with an important feature of the present invention, the apparatus includes a rotary guide block 62 which is shown disposed between the wire-advance drive unit 55 and the upper wire precision-positioning guide member 23 but may be disposed immediately above the upper surface 2a of the workpiece 2 or between the member 23 and the members 52, 53. The rotary guide block 62 is rotatably supported via bearings 63 on a fixed wall 64 and is formed with a tapered opening 65 having a frustoconical wire guide surface 66 tapered convergently in the direction of the workpiece 2 and arranged to be coaxial with the wire straight line path defined between the guide members 21 and 9. The block 62 has a ring spur gear 67 secured thereon in mesh with a spur gear 68 drivingly coupled with the drive shaft of a motor 69. Driving the motor 69 in one direction thus rotates the rotary block 62 about its rotary axis that is the axis of the tapered opening 65 in alignment with the straight line path for the electrode wire 3. The block 62 is also shown as having a plurality of frustoconical wall sections 62a, 62b and 62c, each being symmetrical about its rotary axis, and separated longitudinally by insulators 70 from adjacent sections. The sections 62a and 62b are shown having sensor brushes 71a and 71b, respectively, for sensing their contact with the broken end of the electrode wire 3 introduced into the opening 65 of the block 62. The brushes 71a and 71b are electrically connected to a control circuit 72 which is in turn connected to the guide member 21 via a brush 73, to the motor 162 and to the motor 69. The control circuit 72 operates to sense an electrical contact of the broken end of electrode wire 3 with one of the wall sections 62a, 62b and 62c and cause it to automatically actuate the motor 69 to commence rotating the rotary guide block 62 in response to the sensed contact. To this end, the sensor may be designed to form a closed circuit when the contact is established, thereby to produce an electrical actuation signal which may be applied to the motor 69. Preferably the motors 69 and 62 are of variable speed type and the control circuit 72 is adapted to control the rate of rotation of the guide block 62 and the rate of advance of the electrode wire 3 in accordance with the position of the particular wall section sensed to have been first contacted by the broken end of electrode wire 3. The control circuit 72 may also be adapted to maintain the rotary guide block 62 stationary when the broken free end contacts none of the divided wall section other than the section 62c.

The rotary guide block 62 is conveniently constructed of two or more semi-blocks arranged to be assembled or brought together to form the unitary block and tapered opening in the position shown for and during the wire threading operation and to be disassembled and withdrawn from the operative position for and during the traveling-wire electroerosion machining operation.

Shown immediately below the lower surface 2b of the workpiece 2 and below the straight through-hole 43 preformed therein is a pair of blocks 74 and 75 which have tapered semi-circular surface formations 74a and 75a designed, when the blocks are rotated into their positions shown, to form a tapered circular opening 76 which constitutes a threaded-wire reception opening coaxial with the straight line path between the guide members 23 and 24. The blocks 74 and 75 are supported by stems 77 and 78 which terminate with gears 79 and 80, respectively, which gears are in mesh with a worm 81 which is bi-directionally rotatable by a motor 82. It will be understood that during the traveling-wire electroerosion machining operation, the blocks 74 and 75 are placed in their angular positions in which they are out of mutual engagement. For the wire-threading operation, the motor 82 is rotated clockwise to bring the blocks 74 and 75 into their operating positions as shown to establish the threaded-wire reception opening 76 while causing the nozzle unit to be retracted downwards against the force of spring 36. The opening 76 is tapered convergently upwards as shown.

It has been found that the rotation of the rotary guide block 62 in accordance with the present invention allows the free end portion of electrode wire 3 projecting from the guide member (21) to be smoothly guided through the convergently tapered guide opening 65, to be smoothly passed through the precision guide opening 23a, to be smoothly threaded into, through and out of the preformed through-hole 43 in the workpiece 2, and then to be smoothly guided through the reception opening 76 and thence into and through the precision guide opening 24a, without catching on any wall portion of the passage. This contrasts favorably with existing wire threading arrangements, in which catching on such wall portions has often occurred. It has be observed that the rotation of the guide block 62 causes the broken free end of the electrode wire 3, when touching on the convergently tapered wall 66 of the opening 65, to be vibrated with a small amplitude and the vibration effectively reduces the contact frictional resistance of the touching free end portion with the wall portions of the threading and guiding passages, thus eliminating the 'catching-on' effect which will otherwise unavoidably takes place.

In advance of the wire-threading operation, the broken end of the upstream broken half of electrode wire 3 in the arrangement shown in FIG. 1 is necessarily located behind the inlet side of the tapered opening 65 and ahead of the upstream guide member 21. Thus, with the rotary guide block 62 arranged upstream of the wire-breaking unit 44 as shown, subsequent to the wire-breaking operation, the upstream broken half is displaced upwards to locate its broken end immediately behind the inlet of the tapered opening 65. This can be achieved by driving the motor 162 so as to move the endless belt 56 in the wire-advance unit 55 brought into the operating position shown, in the direction opposite to that shown by a given amount. At this stage, the downstream broken half of electrode wire 3 may have been removed from the system by being collected into the takeup unit 8 and disintegrated into wire pieces 17 by virtue of operation of the drive motor 12. In the threading operation, the upstream broken half is passed through the rotary guide block 62 (opening 65), the guide hole 23 (die opening 23a), the further guide 54, the workpiece 2 (through-hole 43), and the guides 76 and 24 and is then drawn in between the roller 9 and the endless belt 13 and thus collected into the takeup unit 8. The wire-advance movement is here produced by driving the motor 162 to displace the endless belt 56 in the direction shown by the arrows and the wire-takeup action accomplished by driving the motor 12 to displace the endless belt 11 in the direction shown. It will be understood that the wire-advance movement may be produced by other than the advance unit 55 and thus by at least a portion of the drive unit for axially driving the electrode wire in the traveling-wire electroerosion machining operation. Thus, for example, the guide roller 5 may have a motor drivingly coupled thereto and rotatable in the forward direction at a speed lower than that of the motor 12 in the wire takeup side 8 to apply a suitable tension to the traveling electrode wire 3 in the electroerosion machining operation. In the threading operation, such a motor is capable of effecting the advance movement of the upper broken half of electrode wire 3 to be threaded through the workpiece 2.

Subsequent to the wire-breaking operation, the downstream broken half of electrode wire 3 need not be collected into the takeup unit 8 altogether. Instead, this broken half may be displaced by driving the motor 12 up to an extent that its broken end locates immediately upstream of the guide member 9. In this case, a wire-connecting unit which may, for example be of the type described in my copending U.S. patent application Ser. No. 193,668 filed Oct. 3, 1980 is provided to connect the located broken end of the downstream broken half with the broken end of the upstream broken half threaded through the workpiece 2. After the wire-connecting operation, the motor 12 may be actuated again to advance the connected electrode wire or re-established continuous stretch of electrode wire 3.

Subsequent to re-establishment of a continuous stretch of electrode wire 3 which occurs when its threaded free end portion or the connecting point of the connected two broken halves is caught between the guide roller 9 and the endless belt 13 and fed towards and between the takeup rollers 10 and 15 and which thus allows a subsequent traveling-wire electroerosion machining operation to be initiated, the motor 82 is driven clockwise to cause each of the blocks 74 and 75 to be angularly displaced via its stem 77, 78, gear 79, 80 and worm 81. This causes the nozzle unit 31 to move upwards under the force of spring 36 and to locate the nozzle opening 31a immediately below the workpiece 2. The threading guide plates 52 and 53 are also retracted from the position shown when the free end portion of wire is caught between the guide roller 9 and the endless belt 13. The blasting air which may remain applied from the nozzle opening 29 to the threading wire to facilitate the threading operation, is now terminated by closing the valve 28.

It will be understood that the breaking unit 44 may, instead of the arrangement shown, be positioned to locate the cutting blades 45 and 46 at a position between the workpiece 2 and the threaded-wire reception guide hole 76 or the downstream machining guide member 24 to allow the continuous wire to be broken at that position. In this case, the upstream broken half of wire is removed from the through-hole 43 by bringing the drive unit 55 into the operating position shown and driving the motor 162 to displace the endless belt 56 in the direction opposite to the direction shown until the broken free end of this half is located immediately behind the inlet of the tapered opening 65 of the rotary guide block 62 while the downstream broken half is removed via the takeup unit 8 out of the system by driving the traction and guide roller 9 and the takeup rollers 10 and 15. Upon repositioning the workpiece 2 to locate a new starting through-hole (43) in alignment with the straight line path between the guide members 21 and 9, the broken free end portion is threaded into, through and out of the new starting through-hole in the manner already described.

Figure 2:
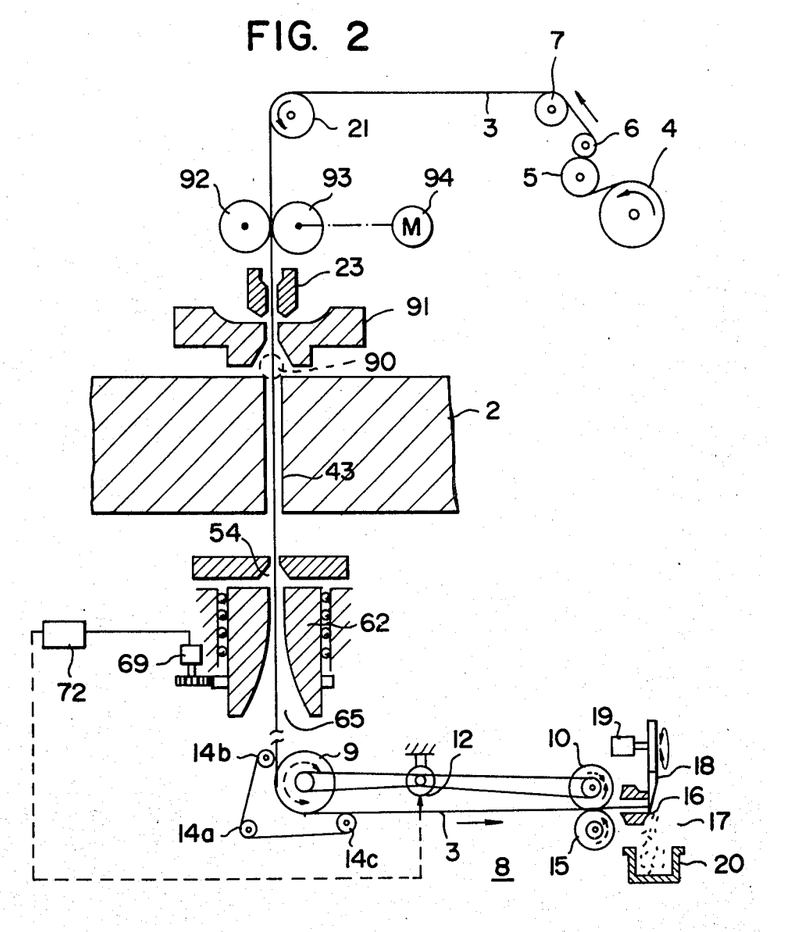
FIG. 2 is a similar view schematically illustrating another arrangement according to the present invention.

FIG. 2 shows a modified embodiment according to the invention. In this embodiment, the rotary guide block 62 is arranged on the downstream side of the workpiece 2. Wire-breaking may be achieved at a location between the workpiece 2 and the upstream machining guide 23 by a breaking and connecting unit 90 in a guide assembly 91. After the breaking of a continuous electrode wire 3, the upstream broken half remains stationary while the downstream broken half is driven forwards, by rotating the rollers 9, 10 and 15 by means of the motor 12 in the directions indicated by the solid arrows shown, until its free end portion is located below the workpiece 2 and immediately above the inlet of the tapered opening 65 of the rotary guide block 62. The workpiece 2 is then repositioned to locate a new starting through-hole (43) in alignment with the straight line path between the guide members 21 and 9. Thereafter, the rollers 9, 10 and 15 are driven in the directions indicated by the broken arrows by the motor 12 to advance the downstream broken half from the takeup side 8 and introduce the broken free end into the tapered opening 65, the motor 69 being energized to rotate the rotary guide block 62 about its rotary axis and thereby enable the broken end to pass through the opening 65 and then through the threading hole 54 and thence into and through the straight through-hole 43 in the workpiece 2. When the upper broken free end portion and the lower broken free end portion are brought together, they are united by the breaking and connecting unit 90 to reestablish a continuous stretch of wire extending between the supply side (4, 5, 6, 7) and the takeup side 8 as shown.

In the arrangement of FIG. 2, rollers 92 and 93 are operated when the breaking and connecting unit 90 is divided into a single-function breaking unit and a single-function connecting unit located between the workpiece 2 and the threading hole 54 or below the rotary guide block 62 and between the workpiece 2 and the upper machining guide member 23, respectively. After the breaking of a continuous electrode wire, the upstream broken half is retracted and removed from the through-hole 43 by driving the rollers 92 and 93 by means of a motor 94 until its free end portion is located between the upper machining guide member 23 and the workpiece 2. The workpiece 2 is then repositioned to locate a new starting through-hole (43) therein in alignment with the straight line path defined between the guide members 21 and 9. Thereafter, the rollers 9, 10 and 15 are driven in the directions indicated by the broken arrows by the motor 12 to advance the downstream broken half from the takeup side 8 to introduce the free end portion of that half into the tapered opening 65 while the motor 69 is driven to rotate the rotary guide block 62 to allow and thereby ensure that the broken free end passes through the opening 65 and thence into and through the through-hole 43 in the workpiece 2. When the upper broken free end portion and the lower broken free end portion are brought together, they are united (e.g. by welding) by the said connecting unit located between the workpiece 2 and the upper machining guide member 10 to reestablish a continuous stretch of wire extending between the supply side (4, 5, 6, 7) and the takeup side (8) as shown. The rollers 92 and 93 may now be disengaged from the electrode wire 3.

The control circuit 72 as already described is here again provided and operates to initiate rotation of the rotary guide block 62 when the broken free end of the downstream broken half introduced into the opening 65 touches the tapered wall thereof. The control circuit 72 may also be adapted to control the rate of rotation of the rotary guide block 62 and/or the rate of advance of the threading wire 3 (here by the motor 12) in accordance with the position of a point of contact of the broken free end with the tapered wall of the opening 65, as described previously.

What is claimed is:

1. A method of automatically threading a continuous electrode wire through a workpiece in a traveling-wire electroerosion machine having a predetermined path of wire travel between wire supply means and wire takeup means, the method comprising the steps of:
   (a) establishing a straight-line threading path across a said workpiece generally in said path of wire travel between the wire supply and takeup means;
   (b) positioning said workpiece to locate a machining-start position thereof in said straight-line threading path;
   (c) disposing, at one side of said workpiece and with axial spacing from the wire supply and takeup means establishing said path, a rotary guide block having a rotary axis and a tapered opening coaxial therewith so as to position said opening axially in alignment with said straight-line threading path, said opening being tapered convergently in the direction of said workpiece;
   (d) locating, behind said opening in said straight-line threading path, a free end of a said electrode wire extending from one of said wire supply and takeup means; and
   (e) advancing said electrode wire from said one of the supply and takeup means to introduce said free end into said tapered opening while rotating said guide block about said rotary axis to allow said free end to pass through said opening and then into and through said workpiece along said threading path.

2. The method defined in claim 1 wherein in step (a) said straight-line path is established across the workpiece between a pair of wire guide members lying between said wire supply and takeup means.

3. The method defined in claim 2 wherein step (d) comprises locating said free end ahead of one said guide members located on the side of said supply means, and behind said rotary guide block being disposed on the side of said supply means with respect to said workpiece.

4. The method defined in claim 3 wherein in step (e), said continuous electrode wire is advanced to bring said free end passed through said workpiece onto the other of said guide members, the method further comprising the step of advancing, in step (e), said electrode wire to guide said free end passed through said other guide member into said takeup means.

5. The method defined in claim 4 wherein said electrode wire is one broken portion of a continuous stretch previously extended between said wire supply and takeup means, the method further comprising, prior to step (b), the steps of breaking said continuous stretch to divide it into said one broken portion and the other broken portion extending to said takeup means and displacing said other broken portion past said other guide member into said takeup means.

6. The method defined in claim 5 wherein said continuous stretch is broken at a region behind the position of said rotary guide block and ahead of said one guide member in said straight-line path to locate said free end in step (d).

7. The method defined in claim 5 wherein said continuous stretch is broken at a region ahead of the position of said rotary guide block in said straight-line path, the method further comprising the step of retracting said one broken portion past said position of the rotary guide block to locate said free end in step (d).

8. The method defined in claim 3 wherein said electrode wire is one broken portion of a continuous stretch previously extended between said wire supply and takeup means, the other broken portion extending from said takeup means and having a broken end located at a region in said straight-line path between said workpiece and the other guide member, and wherein in step (e) said one broken wire portion is advanced until its broken free end is brought into engagement with the broken free end of said other broken wire portion, the method further comprising the step of connecting said two broken ends together at said region to re-establish a said continuous stretch.

9. The method defined in claim 8, further comprising, prior to step (b), the steps of breaking said continuous stretch at said region and retracting said one broken portion to locate its broken free end in step (d).

10. The method defined in claim 8, further comprising, prior to step (b), the steps of breaking said continuous stretch intermediate between the positions of said one guide member and said rotary guide block in said straight-line path and displacing said other broken portion past said position of the rotary guide block to locate its broken free end at said region.

11. The method defined in claim 8, further comprising, prior to step (b), the steps of breaking said continuous stretch intermediate between the positions of said rotary guide block and said other guide member, retracting said one broken portion to locate its broken free end in step (d) and displacing said other broken portion to locate its broken free end at said region.

12. The method defined in claim 1 wherein said continuous electrode wire extends from said takeup means and wherein step (c) comprises disposing said rotary guide block at said one side located on the side of said takeup means with respect to said workpiece.

13. The method defined in claim 2 wherein step (d) comprises locating said free end ahead of one said guide member located on the side of said takeup means, and behind said rotary block being disposed on the side of said takeup means with respect to said workpiece.

14. The method defined in claim 13 wherein said electrode wire is one broken portion of a continuous stretch previously extended between said wire supply and takeup means, the other broken portion extending from said supply means and having a broken end located at a region in said straight line path between the other guide member and said workpiece, and wherein in step (e) said one broken wire portion is advanced until its broken free end is brought into engagement with the broken end of said other broken wire portion, the method further comprising the step of connecting said two broken ends together at said region to re-establish a said continuous stretch.

15. The method defined in claim 14, further comprising, prior to step (b), the steps of breaking said continuous stretch at said region and retracting said one broken portion to locate its broken free end in step (d).

16. The method defined in claim 14, further comprising, prior to step (b), the steps of breaking said continuous stretch intermediate between the positions of said one guide member and said rotary guide block in said straight line path and displacing said other broken portion past said position of the rotary guide block to locate its broken free end at said region.

17. The method defined in claim 14, further comprising, prior to step (b), the steps of breaking said continuous stretch intermediate between the positions of said rotary guide block and said other guide member, retracting said one broken portion to locate its broken free end in step (d) and displacing said other broken portion to locate its broken free end at said region.

18. The method defined in claim 1, further comprising the steps, in step (e), of sensing a contact of said free end of the electrode wire introduced into said opening with a tapered wall thereof and rotating said rotary guide block in response to the sensed contact.

19. The method defined in claim 1 wherein said opening is divided in its longitudinal direction to form a plurality of sections bounded by frustoconical wall sections, said wall sections being symmetrical about said rotary axis, the method further comprising the step of sensing a contact of said free end with one of said wall sections.

20. The method defined in claim 19, further comprising the step of controlling the speed of rotation of said rotary block in accordance with the position of the particular wall section first contacted by said free end.

21. The method defined in claim 20 wherein said rotary guide block is selectively maintained stationary in response to said free end first contacting the wall section closest to the outlet of said convergent tapered opening.

22. The method defined in claim 19 or claim 20, further comprising the step of controlling the rate of advance of said electrode wire in step (e) in accordance with the position of the particular wall section first contacted by said free end.

23. An apparatus for automatically threading a continuous electrode wire through a workpiece in a traveling-wire electroerosion machine having a predetermined path of wire travel between wire supply means and wire takeup means, the apparatus comprising:
 a pair of wire guide members positionable in said path of wire travel for establishing a straight-line threading path across a workpiece;
 means for positioning a said workpiece to locate its machining-start point to fall in said straight-line threading path;
 a rotary guide block having a rotary axis and a tapered opening coaxial therewith axially spaced from the wire guide members establishing said path;
 means for rotatably supporting said guide block at one side of said workpiece in said straight-line path between said wire supply and takeup means to locate said tapered opening axially in alignment with said straight-line threading path and tapered convergently in the direction of said workpiece;
 means for locating, behind said opening of the rotary guide block in said straight-line path, a free end of a said continuous electrode wire extending from one of said wire supply and takeup means;
 means for advancing said continuous electrode wire from said one of the supply and takeup means to introduce said free end into said tapered opening; and
 means for rotating said guide block about said rotary axis to allow said free end to be advanced by said advancing means through said opening of the guide block when rotating and then into and through said workpiece along said straight-line threading path.

24. The apparatus defined in claim 23, further comprising control means associated with said rotating means for rotating said rotary guide block only in response to a contact of said broken end of said electrode wire introduced into said opening with a tapered wall thereof.

25. The apparatus defined in claim 23, further comprising means for sensing a contact of said free end of the electrode introduced by said advancing means into said opening with a tapered wall thereof and producing in response to such a contact an electrical signal, and control means for acting on said rotating means in response to a said electrical signal to rotate said rotary guide block.

26. The apparatus defined in claim 23, claim 24 or claim 25 wherein said electrode wire is one broken portion of a continuous stretch extending between said supply and takeup means, the apparatus further comprising means for breaking said continuous stretch at a location intermediate between said guide members to divide it into said one broken portion and the other broken portion extending from the other of said supply and takeup means and having a broken free end.

27. The apparatus defined in claim 26, further comprising means for connecting the broken free end of said broken wire portion which was threaded through said workpiece with the broken free end of said other broken wire portion at a location of said guide block in said straight-line path.

28. The apparatus defined in claim 26, further comprising gas blasting means for applying a blast of gas onto said continuous stretch to strip a residue of electroerosion machining liquid adherent thereon at least in the region of said location.

29. The apparatus defined in claim 26, further comprising means for heating said continuous stretch prior to breaking by said breaking means.

30. The apparatus defined in claim 23 wherein said opening is divided in its axial direction to form a plurality of sections bounded by frustoconical wall sections, said wall sections being symmetrical about said rotary axis, the apparatus further comprising means for sensing said free end first contacting one of said wall sections when introduced into said opening by said advancing means.

31. The apparatus defined in claim 30, further comprising means responsive to said sensing means for controlling the speed of rotation of said guide block in accordance with the position of the particular wall section first contacted by said free end.

32. The apparatus defined in claim 30 or claim 31, further comprising means responsive to said sensing means for controlling the rate of advance of said electrode wire in accordance with the position of the particular wall section first contacted by said broken end.

* * * * *